March 21, 1950      G. J. CRETIN      2,501,210

FISHHOOK

Filed June 11, 1947

Inventor
George J. Cretin
by *[signature]*
ATTORNEY

Patented Mar. 21, 1950

2,501,210

UNITED STATES PATENT OFFICE 2,501,210

FISHHOOK

George J. Cretin, Cluny, Alberta, Canada

Application June 11, 1947, Serial No. 753,903
In Canada June 11, 1946

1 Claim. (Cl. 43—43.16)

My invention relates to fish hooks, and the object of my invention is to provide a hook for this purpose and of the type described herein which will satisfactorily enable the person fishing to release the hook from the fish's mouth or interior with great ease simply by the pulling of a short piece of cord in order to unlock a spring controlled latching bolt that normally retains the hook in its bait carrying position for fishing.

An advantage in my invention is that there is considerably less likelihood of tearing out the inside parts of the fish when dislodging the hook from its mouth or inside, and a further advantage is that on account of the particular shape of the hook it is impossible to reset the hook in its "ready" position without first pulling on the latch bolt controlling cord against its spring, thus leaving the hook in a more safe position when not in use.

With the above mentioned objects and advantages in view this invention consists in the novel features of construction hereinafter described and claimed, and in the drawings accompanying this specification it must be observed that similar numerals refer to similar parts throughout the different views.

Figure 1:
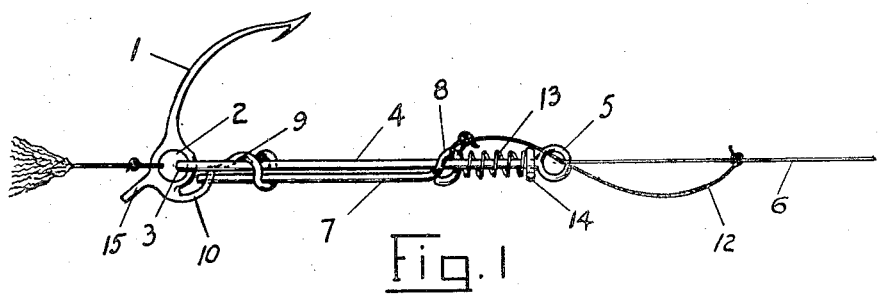
Fig. 1 is a side view of the hook, latch and line, as the hook is locked in position ready for fishing.

In the drawings: A fish hook 1 is provided with a single barbed end of conventional shape, and has an eye 2 at its shank or base end of the curved portion. This eye is engaged by the looped end 3 of a straight bar member 4, the end of which bar opposite to the loop 3 being formed as an eye 5, to which is fastened the fishing line 6.

A latch bolt member 7 parallels the said bar member 4, which bolt is slidably disposed by means of a bent eye 8 on the said bar, and has its opposite end near the hook slidably insertable in a hooked portion 9 forming part of the said looped end 3. This allows the locking bolt 7 to slide back and forth alongside the bar 4 and parallel therewith.

A prong 10 projects from the eye 2 of the hook and is curved upwardly in its side elevational view, and also partly around and spaced from the said eye. This prong 10 is apertured at 11, into which aperture the straight end of the bolt 7 is insertable for withdrawal by means of a cord 12 attached to the eye 8. The opposite end of this cord is secured to the fishing line 6 for hand manipulation to release the bolt 7 from the aperture 11 by pulling thereon.

A helical spring 13 encloses the bar member 4 between the eye 8 on the bolt 7 and the eye 5 on the bar itself, and this spring is compressible on the cord being pulled. A washer 14 is disposed on the bar 4 against which the spring abuts.

Figure 2:
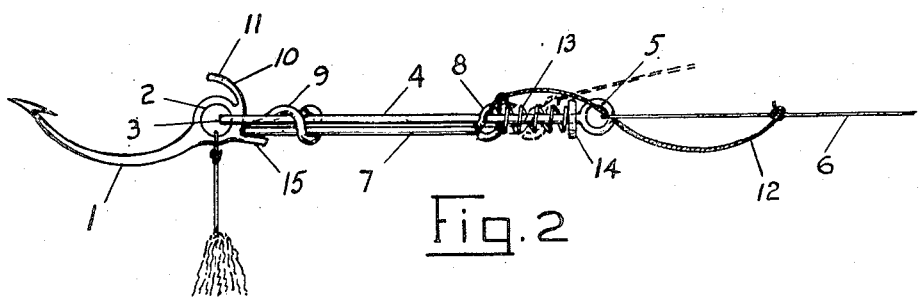
Fig. 2 is a side view when the hook is released from its locked position for extraction from the fish.
Figure 3:
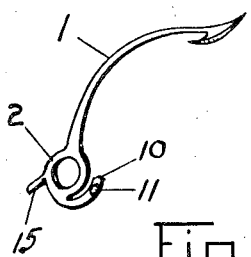
Fig. 3 is a perspective detail view of the hook showing the lock bar reception aperture.
Figure 4:
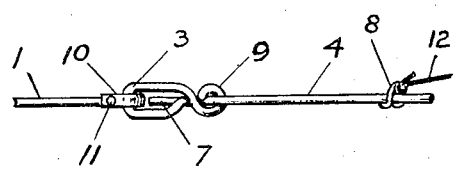
Fig. 4 is a plan view in part of Fig. 1.

A curved additional prong 15 projects from the eye portion of the hook in such disposition that when the hook is released for withdrawal purposes by sliding the bolt 7 away therefrom the end of the bolt catches on the underside of said prong 15, as seen in Fig. 2, and holds the hook extended until it may be reset for action on drawing the bolt 7 against the spring 13 and locking as before.

The bait line may readily be attached to the hook by threading the line through the eye portion of the hook. The prong 15 is prevented from further rotation around the eye support loop 3 by its contact with the twisted portion of this same loop, and is therefore kept secure between this loop end and the locking bolt 7.

I claim:

A fish hook as described, comprising a barbed prong having an eye member at the opposite end from the barbed point of said prong, a bar with an eye to connect with a fishing line, said bar having a looped end portion engaging said eye member of the prong, a hook extending from said looped end portion of said bar, a latch bolt having an end eye portion slidable on said bar, the bolt passing through said extension hook, a curved prong projecting from said eye member end of the barbed prong and apertured to receive the end of said latch bolt to hold the barbed prong in fish-catching position, a second prong projecting from said eye member to retain the barbed prong in its inoperable position, a spring on said fish line bar braced between the eye thereof and said latch bolt eye portion, and a cord for manual operation of said latch bolt.

GEORGE J. CRETIN.

REFERENCES CITED

The following references are of record in the file of this patent:

UNITED STATES PATENTS

| Number | Name | Date |
|---|---|---|
| 1,791,083 | Pike | Feb. 3, 1931 |